United States Patent [19]

Murata et al.

[11] Patent Number: 4,934,729
[45] Date of Patent: Jun. 19, 1990

[54] DOUBLE LINK TYPE SUSPENSION SYSTEM

[75] Inventors: Yoichi Murata, Kawasaki; Junichi Shibata, Fujisawa; Takuya Murakami, Atsugi, all of Japan

[73] Assignee: Nissan Motor Co., Ltd., Yokohama, Japan

[21] Appl. No.: 259,181

[22] Filed: Oct. 18, 1988

[30] Foreign Application Priority Data

Oct. 19, 1987 [JP] Japan ................ 62-263581

[51] Int. Cl.⁵ .............................. B60G 3/00
[52] U.S. Cl. .................... 280/666; 280/96.1; 280/661; 280/675; 280/724; 280/688
[58] Field of Search ............ 280/688, 715, 724, 725, 280/726, 661, 666, 96.1, 675

[56] References Cited

U.S. PATENT DOCUMENTS

| | | | |
|---|---|---|---|
| 1,828,425 | 10/1931 | Matthews | 280/89 |
| 3,630,303 | 12/1971 | Froumajou | 180/43 |
| 4,341,397 | 7/1982 | Morimura et al. | 280/688 |
| 4,500,111 | 2/1985 | Woo | 280/688 |
| 4,565,389 | 1/1986 | Kami et al. | 280/688 |
| 4,591,184 | 5/1986 | Matschinsky | 280/666 |

FOREIGN PATENT DOCUMENTS

| | | |
|---|---|---|
| 141093 | 5/1985 | European Pat. Off. |
| 253383 | 1/1988 | European Pat. Off. |
| 253384 | 1/1988 | European Pat. Off. |
| 279135 | 8/1988 | European Pat. Off. |
| 1573273 | 7/1969 | France |
| 2475995 | 8/1981 | France |
| 59-96007 | 6/1984 | Japan |
| 60-135314 | 7/1985 | Japan |
| 62-120208 | 6/1987 | Japan |
| 62-120209 | 6/1987 | Japan |
| 2034654 | 6/1980 | United Kingdom |
| 2069947 | 9/1981 | United Kingdom |

*Primary Examiner*—Richard A. Bertsch
*Attorney, Agent, or Firm*—Foley & Lardner, Schwartz, Jeffery, Schwaab, Mack, Blumenthal & Evans

[57] ABSTRACT

A double link type suspension system having an extension member for movably connecting the upper section of a knuckle and an upper control arm movably connected to the side of a vehicle body. A rotatable joint mechanism is provided between the knuckle upper section and the extension member and includes a cylindrical member fixed to the extension member. The axis of the cylindrical member is aligned with an axis line passing through a joint between the lower section of the knuckle and a lower control arm movably connected to the vehicle body side. A pivot shaft fixed to the knuckle upper section is disposed inside the cylindrical member and rotatably supported through two deep groove ball bearings disposed between the pivot shaft and the cylindrical member, thereby reducing jointing error between the knuckle and the extension member thus reducing camber angle error.

33 Claims, 4 Drawing Sheets

DOUBLE LINK TYPE SUSPENSION SYSTEM

BACKGROUND OF THE INVENTION

1. Field of the Invention

The present invention relates generally to a double link type suspension system, for example, in use for an automotive vehicle, and more particulary to a double wish-bone type suspension system having upper and lower control arms and a shock absorber installed between a vehicle body side and a wheel side.

2. Description of the Prior Art

In connection with automotive vehicles, a variety of double link type suspension systems have been proposed and put into practical use as disclosed, for example, in Japanese Patent Provisional (First) Publication No. 59-96007 (referred hereinafter to as "the first prior art") and in Japanese Patent Provisional (First) Publication No. 60-135314 (referred hereinafter to as "the second prior art"). In a suspension system of the first prior art, an upper section of a knuckle is upwardly extended over a wheel to form an upper end thereof, which upper end is connected through an upper control arm to a vehicle body. In a suspension system of the second prior art, an upper control arm is prolonged as compared with as usual, and a steering axis (kingpin axis) is set relardless of the upper control arm.

Now in order to obtain a suitable suspension geometry, the upper control arm of the double link type suspension system is required to ensure a considerable length and therefore cannot be so shortened.

The above-summarized prior arts will be discussed. In the case of the first prior art suspension system, the inboard end of the upper control arm is supported to a vehicle body while the outboard end of the same is connected to the upper end of the knuckle, and additionally the upper control arm cannot be shortened for the abovementioned reason, thereby allowing a wheel house to extend to the side of an engine compartment in accordance with the length of the upper arm. In addition, a shock absorber is disposed generally parallel with the upwardly extended knuckle upper section. Thus, the width of the wheel house is enlarged thereby to unavoidably minimize the width of the engine compartment. Particularly in this first prior art suspension system, since the knuckle disposed parallel with the shock abosrber is turned together with the wheel during steering, a sufficient wide space is necessary between them in order to prevent interference therebetween during turning of the vehicle. This particularly enlarges the width of the wheel house. Furthermore, the turning of the knuckle together with the wheel requires a ball joint large in height dimension for connection between the upper end of the knuckle and the upper control arm, so that the height of the wheel house is unavoidably enlarged.

In the case of the second prior art suspension system, the distance between the upper and lower control arms is relatively small, variation of camber angle and caster angle due to assembly error of suspension system component parts comes out in a relatively high value. Additionally, such camber angle and caster angle largely change depending upon vertical swing of the upper and lower control arms. These provide an insufficient controllability of vehicle steering.

SUMMARY OF THE INVENTION

An object of the present invention is to provide an improved double link type suspension system for a vehicle, adapted to increase freedom of selection of loation of the outboard end section of an upper control arm by separating elements for setting a steering axis and elements for setting camber angle, thereby minimizing the width and height of a wheel house as much as possible to enlarge the width of an engine compartment located thereinside while setting wheel alignment suitable.

Another object of the present invention is to provide an improved double link type suspension system in which assembly error due to a rotatable joint mechanism is reduced as much as possible to reduce camber angle error while facilitating assembly operation of the system.

A double link type suspension system according to the present invention is comprised of an extension member for movably connecting the upper section of a knuckle and an upper control arm movably connected to the side of a vehicle body. A lower control arm is provided to swingably connect the lower section of the knuckle and the vehicle body side. Additionally, a joint mechanism is provided to rotatably connecting the knuckle upper section and the extension member and includes a cylindrical member whose axis is aligned with an axis line passing through a joint between the knuckle lower section and the lower control arm. At least two rolling bearings are supported inside the cylindrical member. A pivot shaft is inserted inside the rolling bearings.

With the above arrangement, a steering axis corresponds to the axis line passing through both the joint between the knuckle lower section and the lower control arm outboard end section and another joint between the knuckle upper section and the extension member, therefore the upper control arm can be situated regardless of the steering axis. Additionally, the component parts turnable together with the wheel (tire) are limited to ones located between both the joints, i.e., near an axle shaft of the wheel. Consequently, interference among the component parts, particularly between the extension member and a shock absorber, during steering can be suppressed as much as possible. This allows the width of the wheel house to become small thereby toenlarge the width of an engine compartment upon combination with the effect of no relation of the upper control arm to the steering axis so that a point at which the upper control arm inboard end section is attached to the vehicle body side is situated near the side section of the vehicle body. Additionally, since the extension member does not turn with the knuckle during steering, the extension member and the upper control arm can be connected with each other by a joint using an elastomeric insulation bushing, thereby minimizing the height of the joint as compared with a ball joint. This lowers the top level of the wheel house and therefore of a hood defining the engine compartment.

Furthermore, variation of camber angle (determined depending upon both the upper and lower control arms) along with vertical movement of the wheel can be suppressed to a lower value, because the upper control arm comes to no relation to setting of the steering axis and therefore can be prolonged while enlarging the distance between the upper and lower control arms by virture of employing the extension member. This greatly contributes to setting wheel alignment appropriate.

Moreover with the above arrangement, the cylindrical member of the joint mechanism is fixedly connected to one of the extension member and the knuckle upper section while the pivot shaft is fixedly connected to the other of them. Rotatable jointing between the side of the knuckle upper section and the side of the extension member is established by the rolling bearings disposed between the pivot shaft and the cylindrical member. Accordingly, assembly error during assembly of the joint mechanism can be securely prevented from being produced, thereby avoiding jointing error between the knuckle and the extension member and preventing camber angle error from being produced. Additionally, the above arrangement simplifies the construction of the joint mechanism while facilitating connection and disconnection operations of the extension member while effectively providing a space for a seal for the rolling bearings.

BRIEF DESCRIPTION OF THE DRAWINGS

In the drawings, like reference numerals designate corresponding elements and parts throughout all the figures, in which.

DETAILED DESCRIPTION OF THE INVENTION

Figure 1:
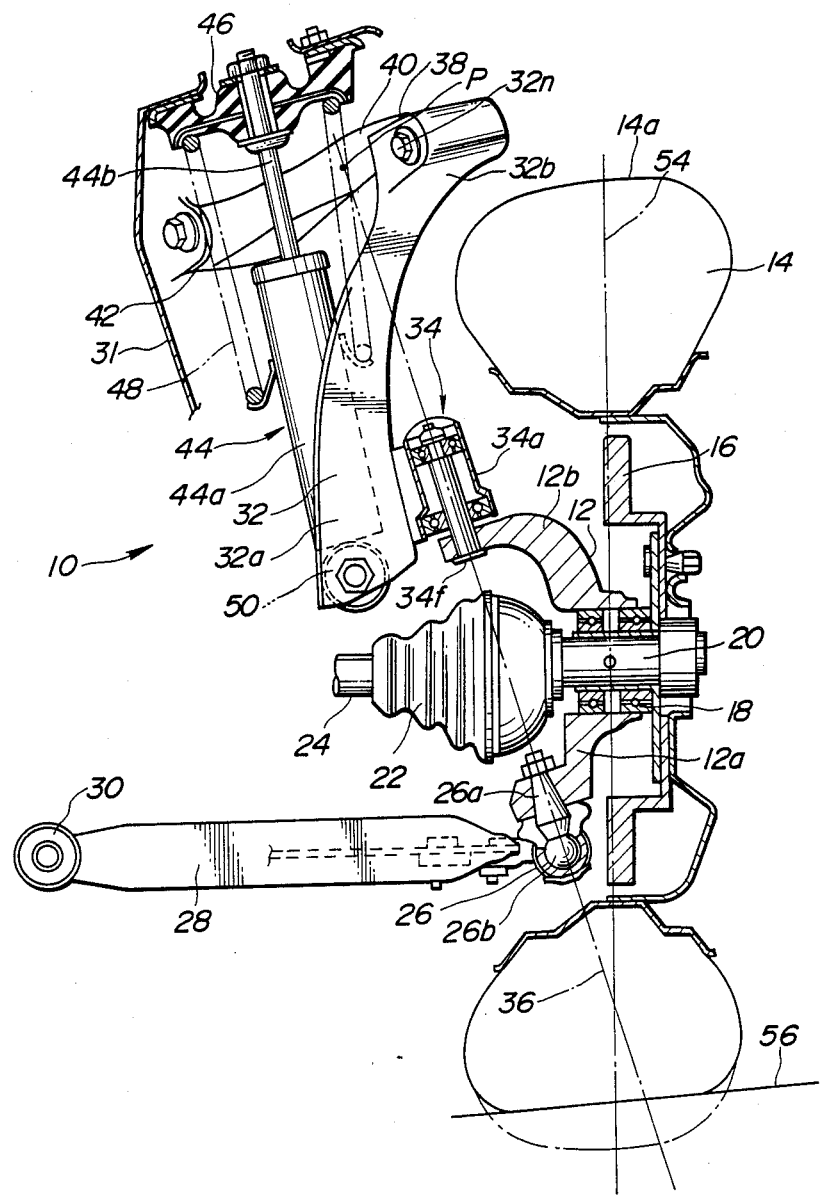
FIG. 1 is a fragmentary front elevation, partly in section, of an embodiment of a double link type suspension system in accordance with the present invention.
Figure 2:
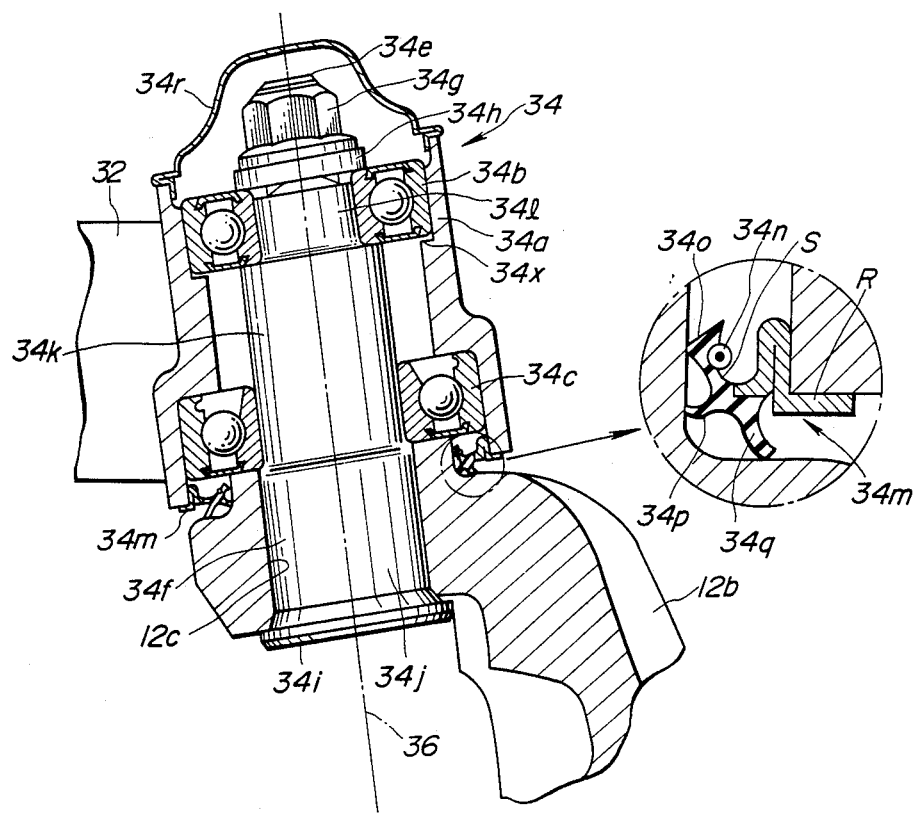
FIG. 2 is an enlarged sectional view of an example of a rotatable joint mechanism used in the suspension system of FIG. 1.

Referring now to FIGS. 1 and 2, there is shown an embodiment of a double link type suspension system 10 in accordance with the present invention. The suspension system 10 of this embodiment is a front suspension system of the double wish-bone type and is used for an automotive vehicle of the type wherein a driving force from an engine (not shown) is transmitted to front wheels (only one wheel 14 shown), for example, the front engine front drive (FF) type or the four wheel drive (4WD) type. The suspension system 10 is comprised of a steering knuckle 12 for rotatably supporting the front wheel 14 provided with a brake disc 16. The knuckle 12 rotatably journals through bearings 18 an axle shaft 20 of the wheel 14 which shaft 20 is connected through a constant velocity joint 22 to a drive shaft 24 driven under the driving force from the engine.

The lower section 12a of the knuckle 12 is connected through a ball joint 26 to the outboard end section of a lower control arm 28 whose inboard end section is connected through a rubber (elastomeric) insulation bushing 30 to a bracket (not shown) of a vehicle body 31. The ball joint 26 includes a ball stud 26a secured to the knuckle lower section 12a, and a retainer 26b which is secured to the outboard end section of the lower control arm 28. The upper section 12b of the knuckle 12 rotatably connected to an extension bracket or member 32 by a roratable joint mechanism 34.

As best shown in FIG. 2, the rotatable joint mechanism 34 includes a generally cylindrical member 34a which is integral with the extension bracket lower end section 32a to form a part of the extension bracket 32. The cylindrical member 34a has an axis which is aligned with the axis of the ball stud 26a of the ball joint 26 to form a steering axis (kingpin axis) 36. Upper and lower deep groove ball bearings 34b, 34c are press-fitted inside the cylindrical member 34a and respectively located at the opposite end sections of the cylindrical member 34a. The ball bearings 34b, 34c are spaced from each other and coaxial with each other with respect to the axis of the cylindrical member 34a. A pivot shaft 34f is inserted inside the inner races of the ball bearings 34b, 34c in such a manner that the ball bearings 34b, 34c are mounted on the pivot shaft 34f. The pivot shaft 34f is inserted in a through-hole 12c formed in the knuckle upper section 12b and fixedly secured at its lower end section with the knuckle upper section 12b. The pivot shaft 34f is formed at its upper end section with a threaded portion 34e with which a tightening nut 34g is engaged. A washer 34e is provided between the nut 34g and the inner race of the upper ball bearings 34b. In this instance, the inner diameter of the upper ball bearing 34b is set to be smaller than that of the lower ball bearing 34c.

The pivot shaft 10f has an annular flange section 34i in contact with the lower surface of the knuckle upper section 12b. A large diameter section 34j of the pivot shaft 10f is integral with the annular flange section 34i and press-fitted in the through-hole 12c of the knuckle upper section 12b. A medium diameter section 34k of the pivot shaft 34f is integral with the large diameter section 34j and inserted inside the inner race of the lower ball bearing 34c in such a manner that the inner race of the ball bearing 34c is in tight contact with the peripheral surface of the medium diameter section 34k. A small diameter section 341 of the pivot shaft 34f is integral with the medium diameter section 34k and inserted inside the inner race of the upper ball bearing 34b in such a manner that the inner race of the ball bearing 34b is in tight contact with the peripheral surface of the small diameter section 341. The medium diameter section 34k is smaller in diameter than the large diameter section 34j and larger in diameter than the small diameter section 341. The threaded section 34e is integral with the small diameter section 341. Accordingly the pivot shaft 34f is coaxial with the cylindrical member 34a and has its axis aligned with the steering axis 36. As shown, the upper end surface of the medium diameter section 34k of the pivot shaft 34f is slightly upwardly separate from the surface of a step section 34x formed at inner surface of the cylindrical member 34a, so that the lower surface of the inner race of the press-fitted ball bearing 34b is slightly spaced apart from the surface of the step section 34x. Accordingly, even upon completion of tightening operation of the nut 34g, a slight clearance is formed between the inner race lower surface of the ball bearing 34b and the upper surface of the step section 34x of the cylindrical member 34a.

Additionally, an annular seal member 34m is installed to the lower end of the cylindrical member 34a on the side of the ball bearing 34c. As shown in an encircled enlarged view, the seal member 34m includes an annular rigid section R press-fitted to the inner peripheral surface of the lower end of the cylindrical member 34a. An annular elastomeric sealing section S is fixedly connected to the press-fitted rigid section R and includes an axially extending annular upper lip portion 34o, a radially outwardly extending annular intermediate lip portion 34p and an axially extending annular lower lip portion 34q. The upper and intermediate lip portions 34o, 34q are in seal contact with the outer peripheral surface of the cylindrical portion of the is contacted at its upper surface with the inner race of the ball bearing 34c. The lower lip portion 34q is in seal contact with the surface of the knuckle upper section 12b. Additionally, a tightening ring 34n is secured to the inner surface of the upper lip portion 34o to bias the lip portions 34o, 34p onto the surface of the cylindrical portion of the knuckle upper section 12b. A seal cap 34r is fitted to the upper end of the cylindrical member 34a on the side of the upper ball bearing 34b so as to cover the threaded end section 34e of the pivot shaft 34f.

Thus the knuckle 12 is rotatable around the steering axis or kingpin axis 36 passing through the rotatable joint mechanism 34 joining the knuckle upper section 12b and the extension bracket 32 and the joint (the rotational axis of the ball joint 26) between the knuckle lower section 12a and the lower control arm 28. Additionally, the ball bearings 34b, 34c disposed between the cylindrical member 34a and the pivot shaft 34f are sealingly covered with the seal member 34m and the cap 34r, thereby securely preventing stone from engaging into and water from penetrating into the ball bearings 34b, 34c during vehicle cruising. This effectively avoids driving impossibility of the vehicle due to stone and water freezing.

The extension bracket 32 is extended upward and curved outward relative to he vehicle body 31 generally in a manner to surround the upper section of the wheel 13 so that the upper end section 32b of the extension bracket 32 reaches a position above the upper-most section 14a of the wheel 14. The extension bracket upper end section 32b is swingably connected through rubber (elastomeric) insulation bushings 38 to the outboard end section of an upper control arm 40 whose inboard end section is swingably connected through rubber (elastomeric) insulation bushings 42 to a bracket (not shown) of the vehicle body 31. It will be understood that the joint between the extension bracket 32 and the upper control arm 40 is sufficient to be one using the rubber insulation bushing 38 having a smaller height dimension because the extension bracket 32 is merely swingable relative to the upper control arm 40. More specifically, the above-mentioned joint between the extension bracket upper end section 32b and the upper control arm outboard end section includes a generally horizontally extending rod member 32n secured to the tip end portion of the upper end section 32b of the extension bracket 32 in such a manner that the tip end portion covers the most of the rod member 32n though not shown. Two cylindrical rubber insulation bushings (not shown) are securely mounted on the rod member 32n and located spaced from each other so as to be covered with the tip end portion of the extension bracket upper end section 32b. The upper control arm 40 is formed at its outboard end section with a cylindrical portion (not shown) which is securely mounted on the rubber insulation bushings, though not shown. Accordingly, relative swinging movement between the extension bracket upper end section 32b and the upper control arm outboard end section is made under distortion of the rubber insulation bushings 38.

A shock absorber 44 is provided to extend generally parallel with the extension bracket 32 and generally vertically installed between the vehicle body 31 and the lower end section 32a of the extension bracket 32. The shock absorber 44 includes an outer tube 44a whose lower end section is connected through a rubber (elastomeric) insulation bushing 50 to the lower end section 32a of the extension bracket 32. A piston rod 44b extending from the outer tube 44a is connected through a mount rubber 46 to the vehicle body 31. Additionally, a coil spring 48 is disposed coaxially with the shock absorber 44 and installed between the mount rubber 46 and the shock absorber outer tube 44a. In this connection, the extension bracket 44 is constructed of press-formed sheet metal and formed generally channel-shaped to have a generally C-shaped cross-section. Accordingly, the extension bracket 44 covers the outer side (near the wheel 14) of the shock absorber outer tube 44a and the lowe-half of the coil spring 48 in such a manner as to surround the shock absorber 44 and the part of the coil spring 48. As seen from FIG. 1, about half the outer periphery of the shock absorber 44 and the coil spring 48 is covered with the extension bracket 32. It will be understood that the generally channel-shaped extension bracket 32 offers a higher strength to the extension bracket itself while allowing to narrow the distance between the shock absorber 44 and the wheel 14 thereby to minimize the space occupied by them. Though not shown, an knuckle arm is provided to be connected to a steering linkage (not shown) through which a steering force or effort is transmitted to the knuckle 12.

In the thus arranged double link type suspension system 10, the connection of the knuckle 12 and the extension bracket or member 32 is carried out as follows: The larger diameter section 34k of the pivot shaft 34f is previously press-fitted in the through-hole 12c of the knuckle upper section 12b from the lower side. The upper and lower deep groove ball bearings 34b, 34c are previously press-fitted respectively in positions. Additionally, the sealing member 34m is previously press-fitted to the lower end of the cylindrical member 34a. Under this state, the pivot shaft 34f is inserted inside the inner races of the ball bearings 34b, 34c from the lower side. Then the tightening nut 34g is tightened upon the washer 34h being brought into engagement with the inner race of the roll bearing 34b. Thus, the knuckle 12 and the extension bracket 32 can be easily connected with each other in a manner to be rotatable relative to each other. Furthermore, when the pivot shaft 34f is inserted, nothing contacts with the lower lip portion 34q of the sealing member 34m thereby preventing the lower lip portion 34q from damaging and being turned up. This allows the lower lip portion 34q to be brought into uniform contact with the upper surface of the knuckle upper section 12b. Disconnection of the knuckle 12 and the extension bracket 32 can be easily accomplished by drawing out the pivot shaft 34f upon removing the seal cap 34r and the tightening nut 34g.

Moreover, since the washer 34h is biased against the inner race of the upper ball bearing 34b during tightening of the tightening operation that the lower surface of the inner race of the upper ball bearing 34b comes into contact with the upper surface of the medium diameter section 34k of the pivot shaft 34f, thereby preventing excessive and less tightening of the tightening nut 34g. In this connection, since a slight clearance is left between the lower surface of the outer race of the upper ball bearing 34b and the surface of the step section 34x of the cylindrical member 34a upon tightening of the tightening nut 34g, an unnecessary pressure is prevented from being applied to the upper ball bearing 34b. Additionally, no clearance exists between the pivot shaft 34f and the inner surface of the through-hole 12c of the knuckle upper section 12b and between the pivot shaft 34f and the ball bearings 34b, 34c. Location by tightening the nut 34g is accomplished upon contact of the inner race of the upper ball bearing 34b with the upper surface of the medium diameter section 34k of the pivot shaft 34f. Such tightening of the tightening nut 34g never causes error in other sections. As a result, no assembly error is made during assembly of the rotatable joint mechanism 34, thereby securely preventing camber angle error from being produced. Furthermore, the lower end of the cylindrical member 34a can be trebly sealed with the upper, intermediate and lower lip portions 34o, 34p, 34q, thereby effectively exhibiting sealing effect for the lower ball bearing 34c. Moreover, sealing for the upper part of the cylindrical member 34a is accomplished with the seal cap 34r, and therefore only one sliding contact seal is necessary thereby improving reliability of sealing while contributing to cost lowering. Since the pivot shaft 34f is fixed at its lower part to the knuckle upper section 12b to be supported in a so-called cantilever state, the length of projection in the knuckle upper section 12b can be considerably shortened thereby achieving weight-lightening of the kunckle.

Bound force input during vehicle cruising from the side of the wheel 14 is transmitted to the cylindrical member 34a through the knuckle 12, the pivot shaft 34f, and the inner face, the balls and the outer face of the ball bearing 34c, and therefore it is received by the ball bearing 34c having a relatively large diameter. Rebound force generated when the wheel 14 moves upwardly is about 1/5 of the bound force, and therefore it can be received by the ball bearing 34b having a relatively small diameter. Thus, sufficient strength and durability can be obtained by press-fitting the upper and lower ball bearings 34b, 34c into the cylindrical member 34a, and accordingly the construction of the rotatable joint mechanism 34 can be simplified while lowering production cost of the suspension system.

Furthermore, in this embodiment, a center line 54 of the wheel-14 (in the direction of width of the wheel in a cross-section including the axis of rotation of the wheel) crosses the steering axis 36 at a position above a horizontal plane 56 at which the wheel (tire) 14 is in contact with the ground or road surface as illustrated in FIG. 1. Furthermore, the steering axis 36 intersects the plane 56 at a position lying outward of the wheel center line 54 thereby to set so-called negative scrub radius. It is to be noted that since the steering axis 36 is determined by locations of both the joint between the knuckle 12 and the extension bracket 32 and the joint between the knuckle 12 and the lower control arm 28, setting the scrub radius positive, negative or zero is not related to the arrangement of the upper control arm 40. Consequently, the rubber insulation bushing 38 between the upper control arm 40 and the extension bracket 32 can be located without any restraint from the steering axis 36. In this connection, in this embodiment, the rubber insulation bushings 38 are located above the wheel 14 so as to project outward relative to the vehicle body so that the rubber insulation bushings 38 and the wheel 14 overlap each other in the direction of width of the vehicle. This ensures a sufficient length of the upper control arm 40 to obtain an optimum wheel alignment while locating the inboard end section of the upper control arm 40 at a position near the outside of the vehicle in the direction of width of the vehicle. It will be understood that this is a reason why the width of a wheel (tire) house is minimized thereby to enlarge the width of an engine compartment.

Thus, ensuring the sufficient length of the upper control arm 40 minimizes the difference in length between the upper and lower contol arms 40, 28 thereby making possible to obtain the optimum wheel alignment. Additionally, since the vertical distance between the upper and lower control arms 40, 28 can be enlarged, variation of camber angle and caster angle due to assembly error of the suspension component parts can be minimized while suppressing development of variation of the camber angle during vertical movement of the wheel 14. Additionally, the rigidity of both the arms 40, 28 increases proportional to the square of the distance between the both the arms, and therefore the rigidity of them is enlarged thereby improving the marginal performance of camber angle variation.

As appreciated, the weight of the vehicle body is supported by the wheel 14 through the mount rubber 46, the coil spring 48, the shock absorber outer tube 44a, the lower control arm 28 and the knuckle 12. The vertical movement of the wheel 14 can be damped under expansion and contraction of the shock absorber 44 and absorbed under deflection of the coil spring 48. Here, during vertical movement of the wheel 14, the knuckle 12 and the extension bracket 32 make their vertical movement together with the wheel 14, so that the lower and upper control arms 40, 28 swing vertically. Along with this, the shock absorber 44 and the coil spring 48 make their expansion and contraction. Thus, since all such members make their vertical movement, no interference occurs between a section including the knuckle upper section 12b and the extension bracket 32 and another section including the shock absorber 44 and the coil spring 48.

It will be understood that when steering force or effort is transmitted from the steering linkage through the knuckle arm 52 integral with the knuckle 12, the knuckle 12 makes its rotation around the steering axis 36 thereby to turn the wheel 14 to steer the vehicle. At this time, the knuckle 12, wheel 14 and the axle shaft 20 turn around the steering axis 36 in which the knuckle 12 is rotatable at the joint mechanism 34 and therefore the extension bracket 32 does not turn. As a result, since the extension bracket 32 makes only the above-mentioned vertical movement along with the wheel 14 so that its relative movement to the upper control arm 40 is only swinging, a ball joint is unnecessary for the joint between the extention bracket 32 and the upper control arm 40, so that the rubber insulation bushings 38 are sufficient for this joint. The rubber insulation bushings 38 are smaller in height dimension than the ball joint, and consequently the height of the wheel house is minimized thereby lowering the level of the hood of the engine compartment. In this connection, the rubber insulation bushing is smaller by about 40 mm in height dimension than the ball joint usually used for a control arm of a double wish-bone type suspension system.

Furthermore, the fact that no rotation is made in the extension bracket 32 during vehicle steering leads to the fact of making no relative displacement of the shock absorber 44 and the coil spring 48 to the extension bracket 32 therby to prevent interference therebetween. In this connection, the extension bracket 32 is formed channel-shaped or C-shaped in cross-section thereby surrounding the shock absorber 44 and the coil spring 48. This extremely minimizes the distance between he shock absorber 44 and the wheel 14, thus making possible to minimize the width of the wheel house thereby to enlarge the width of the engine compartment, in combination with the fact that freedom of location of the upper control arm 40 increases. It will be understood that, in this case, the shock absorber 44 and the coil sprung 48 are prevented from being injured with spring stone and the like since the shock absorber cylinder 44a and the coil spring lower part are covered or protected with the extension bracket 32.

Moreover, during vehicle starting or braking, relative displacement force developed between the vehicle body 31 and the wheel 14 acts along an extension of the steering axis 36 on the upper control arm 40. In other words, the relative displacement force is input to a point P positioned midway between the inboard and outboard end sections of the upper control arm 40. Thus, such force input is made to the position nearer to the vehicle body 31 than in a case in which the same force input is made to the outboard end section of the upper control arm 40, and therefore less load due to such force input is applied to a portion of the vehicle body 31 to which portion the inboard end section of the upper control arm 40 is attached. This makes possible to lighten the weight of the vehicle body portion to which the upper control arm is attached, and minimize the size and soften the rubber insulation bushing 42 used in the joint between the upper control arm 40 and the vehicle body 31. Such softening the rubber insulation bushing leads to an increase in absorption efficiency for vibration input from the side of the wheel 14, thus reducing vehicle vibration and booming noise due to the vibration.

While the above-discussed embodiment has been shown and described to be so arranged that the lower end section of the shock absorber 44 is connected to the knuckle upper section 12a so that the weight of the vehicle body is not supported by the lower control arm 28 thereby to minimize the rigidity of the lower control arm 28 and the rubber insulation bushing 30 and enlarge the space around the drive shaft 24, it will be appreciated that the lower end section of the shock absorber 44 may be supported to the lower control arm 28.

Figure 3:
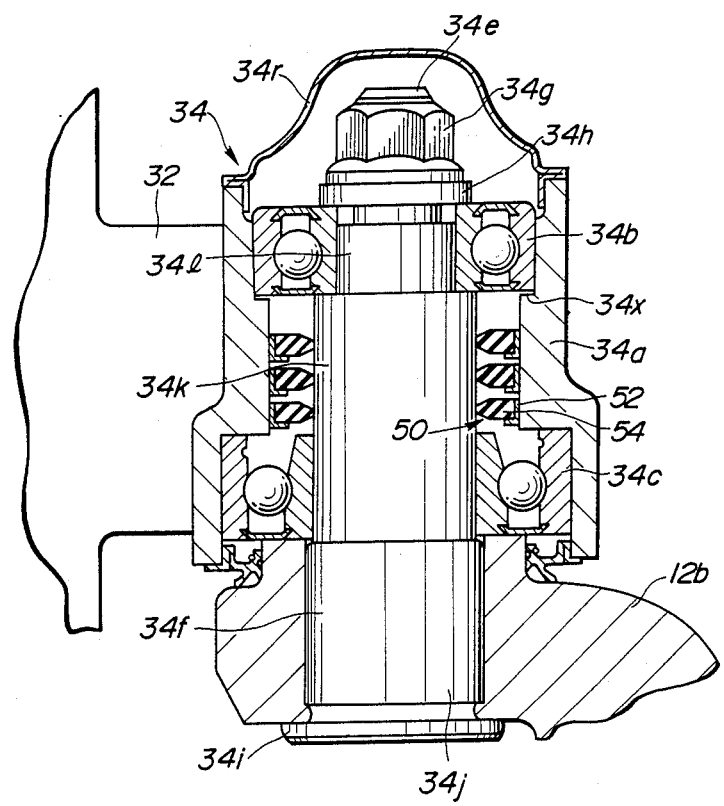
FIG. 3 is an enlarged sectional view similar to FIG. 2 but showing another example of the rotatable joint mechanism to be used in the suspension system of FIG. 1.

FIG. 3 illustrates another example of the rotatable joint mechanism 34 of the double link type suspension system according to the present invention, similar to that of FIG. 2 and arranged to reduce shimmy generated in the rotatable joint mechanism 34. More specifically, a plurality of annular elastic members 50 are fixedly secured to the inner peripheral surface of the cylindrical member 34a between the upper and lower deep groove ball bearings 34b, 34c. Each elastic member 50 includes a rigid ring 52 which is press-fitted to the inner peripheral surface of the cylindrical member 34a and has a L-shaped cross-section. An elastomeric ring 54 is bonded to the inner peripheral surface of the rigid ring 52 and has an edge-like inner peripheral portion in press contact with the medium diameter section 34k of the pivot shaft 34f.

With this arrangement, by virtue of the elastic members 50 disposed between the cylindrical member 34a and the pivot shaft 34f, stable friction is developed between the cylindrical member 34a and the pivot shaft 34f upon selection of suitable characteristics of the elastomeric ring 54, thereby reducing shimmy generated in the rotatable joint mechanism 34 and due to turning of the wheel 14.

Figure 4:
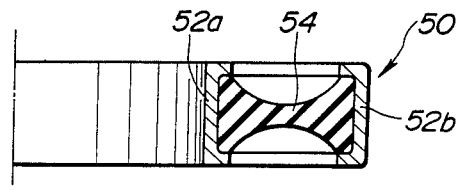
FIGS. 4A to 4C are fragmentary cross-sectional views of a variety of annular elastic members to be used in place of those in the rotatable joint mechanism of FIG. 3.
Figure 4:
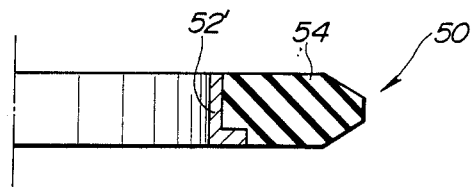
Figure 4:
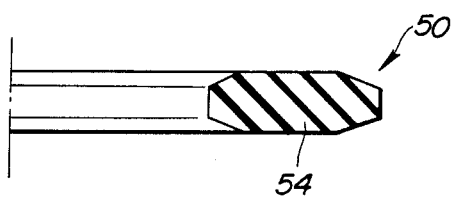

Further examples of the annular elastic member 50 are shown in FIGS. 4A to 4C. In FIG. 4A, the annular elastic member 509 includes the elastomeric ring 54 disposed between a first rigid ring 52a press-fitted on the pivot shaft 34f and a second rigid ring 52b press-fitted on the inner peripheral surface of the cylindrical member 34a. In FIG. 4B, the annular elastic member 50 includes the elastomeric ring 54 bonded to the rigid ring 52' press-fitted on the pivot shaft 34f, in which the edge-like outer peripheral portion is in press contact with the inner peripheral surface of the cylindrical member 34a. In FIG. 4C, the annular elastic member 50 is an elastomeric ring 54 disposed between and in press contact with the inner peripheral surface of the cylindrical member 34a and the peripheral surface of the pivot shaft 34f.

Although the above-discussed embodiments have been shown and described such that the pivot shaft 34f is fixed to the side of the knuckle 3 while the cylindrical member 34a is integrally formed at the side of the extension member 32, it will be understood that the pivot shaft 34f may be fixedly connected to the side of the extension member 32 while the cylindrical member 34a is fixedly connected to the side of the knuckle 3.

While only the front suspension systems for the vehicles of the front engine front wheel drive type or the four wheel drive type have been shown and described, it will be understood that the principle of the present invention may be applicable to other suspension systems such as a front suspension system for a vehicle of the front engine rear wheel drive type or a rear suspension system.

What is claimed is:

1. A double link type suspension system for a vehicle, comprising:
    a knuckle for rotatably supporting a wheel of the vehicle;
    a lower control arm for swingably connecting a lower section of said knuckle and side of a vehicle body, said lower control arm being movably connected through a first joint to the knuckle lower section;
    an upper control arm movably connected to said extension member;
    an extension member for movably connecting an upper section of said knuckle and said upper control arm; and
    a joint mechanism through which the knuckle upper section is movably connected to said extension member,
    said joint mechanism including
        a cylindrical member whose axis is aligned with an axis line passing through said first joint,
        at least two rolling bearings supported inside said cylindrical member, said at least two rolling bearings include first and second rolling bearings which are located at axially opposite end sections, and
        a pivot shaft disposed inside said rolling bearings.

2. A double link type suspension system as claimed in claim 1, wherein said pivot shaft is formed with a threaded portion, wherein said joint mechanism includes a tightening nut engaged with said pivot shaft threaded portion and in contact with inner race of one of said rolling bearings.

3. A double link type suspension system as claimed in claim 1, wherein said cylindrical member of said joint mechanism is fixedly connected to said extension member, wherein said pivot shaft of said joing mechanism is fixedly connected to the upper section of said knuckle.

4. A double link suspension system as claimed in claim 1, wherein said pivot shaft is coaxial with said cylindrical member.

5. A double link type suspension system as claimed in claim 1, wherein said first rolling bearing is larger in inner diameter than said second rolling bearing.

6. A double link suspension system as claimed in claim 5, wherein said pivot shaft is fixedly supported in said knuckle upper section and includes a first section at which said pivot shaft is fixedly supported in said knuckle upper section, a second section integral with said first section, and a third section integral with said second section and smaller in diameter than said second section, said first and second rolling bearings being mounted respectively on said first and second sections.

7. A double link type suspension system as claimed in claim 1, further comprising a plurality of annular elastic members interposed between and in contact with said pivot shaft and said cylindrical member.

8. A double link type suspension system as claimed in claim 7, wherein each annular elastic member includes an elastomeric ring in slidable contact with the peripheral surface of said pivot shaft.

9. A double link type suspension system as claimed in claim 7, wherein each annular elastic member includes an elastomeric ring in slidable contact with inner peripheral surface of said cylindrical member.

10. A double link type suspension system as claimed in claim 1, further comprising a shock absorber having a first end section connected to the vehicle body side, and a second end section movably connected to said extension member.

11. A double link type suspension system as claimed in claim 10, wherein said first end section of said extension member is fixedly secured to an outer tube of said shock absorber.

12. A double link type suspension system as claimed in claim 10, wherein said lower control arm has a first end section movably connected to said knuckle lower section, and a second section movably connected to the vehicle body side.

13. A double link type suspension system as claimed in claim 12, wherein said extension member has a first end section provided with said joint mechanism, and a second end section.

14. A double link type suspension system as claimed in claim 13, wherein said upper control arm has a first end section movably connected to the second end section of said extension member, and a second end section movably connected to the vehicle body side.

15. A double link type suspension system as claimed in claim 14, wherein said extension member second end section and said upper control arm first end section are connected by a second joint, said second joint being separate from a vertical plane containing a point in a horizontal plane passing through said second joint, said axis line passing through said point, said second joint being located between said vertical plane containing said point and a wheel vertical plane containing center line of said wheel and perpendicular to axis of rotation of said wheel.

16. A double link type suspension system as claimed in claim 15, wherein said second joint is situated above the cuter peripheral surface of said wheel.

17. A double link type suspension system as claimed in claim 15, wherein said axis line serves as a steering axis.

18. A double link type suspension system as claimed in claim 15, wherein said point resides in said upper control arm and separate from said second joint 19. A double link type suspension system as claimed in claim 18, wherein said axis line intersects said wheel vertical plane at a point above a horizontal plane at which said wheel is in contact with road surface.

20. A double link type suspension system as claimed in claim 19, wherein said axis line intersects said horizontal plane at a point outside of said wheel vertical plane in a lateral direction of the vehicle body.

21. A double link type suspension system as claimed in claim 14, wherein said knuckle upper section is rotatably connected to said extension member first end section to which said shock absorber second end section is connected 22. A double link type suspension system as claimed in claim 21, wherein said shock absorber second end section is connectd through an elastomeric bushing to said extension member first end section.

23. A double link type suspension system as claimed in claim 10, wherein said second joint includes a rod member fixedly secured to said extension member second end section, and first and second elastomeric bushings securely mounted on said rod member and located on the opposite sides of said extension member second end section, said upper control arm first end section being mounted on said elastomeric bushings.

24. A double link type suspension system as claimed in claim 23, wherein said upper control arm first end section has a cylindrical portion which is mounted on said first and second elastomeric bushings.

25. A double link type suspension system as claimed in claim 10, wherein said extension member is generally channel-shaped and disposed to surround at least a part of periphery of said shock absorber.

26. A double link type suspension system as claimed in claim 25, wherein said extension member is formed of a press-formed sheet metal and includes a generally vertically extending base plate portion located between said shock absorber and said wheel, and first and second side plate portions integral with said base portion and extending along said base portion, said base plate portion and first and second side plate portions defining an elongate space in which at least a part of said shock absorber is positioned.

27. A double link type suspension system as claimed in claim 1, wherein said extension member is rotatable around said axis line.

28. A double link type suspension system as claimed in claim 1, wherein the vehicle is of a front engine front wheel drive type.

29. A double link type suspension system as claimed in claim 1, wherein the vehicle is a four wheel drive type.

30. A double link type suspension system as claimed in claim 1, wherein said wheel has an axle shaft connected through a constant velocity joint to a drive shaft which is driven by an engine, said axle shaft being rotatably journalled by said knuckle.

31. A double link type suspension system as claimed in claim 1, wherein said first joint is a ball joint whose axis is aligned with said axis line.

32. A double link type suspension system as claimed in claim 31, wherein said ball joint includes a ball stud secured to said knuckle lower section, said ball stud having an axis aligned with said axis line, and a retainer for movably supporting said ball stud, secured to said lower control arm.

33. A double link type suspension system as claimed in claim 1, wherein said rolling bearings are deep groove ball bearings.

* * * * *